(12) United States Patent
Liao et al.

(10) Patent No.: US 12,055,231 B2
(45) Date of Patent: Aug. 6, 2024

(54) BLAST GATE FOR DUST COLLECTION

(71) Applicant: Hui-Chuan Liao, Oakland, CA (US)

(72) Inventors: Hui-Chuan Liao, Oakland, CA (US); Yu-Chen Hsiao, Taichung (TW)

(73) Assignee: Hui-Chuan Liao

( * ) Notice: Subject to any disclaimer, the term of this patent is extended or adjusted under 35 U.S.C. 154(b) by 24 days.

(21) Appl. No.: 18/075,268

(22) Filed: Dec. 5, 2022

(65) Prior Publication Data
US 2024/0183450 A1    Jun. 6, 2024

(51) Int. Cl.
*F16K 3/02* (2006.01)
*A47L 7/00* (2006.01)
*A47L 9/24* (2006.01)

(52) U.S. Cl.
CPC .......... *F16K 3/0281* (2013.01); *A47L 7/0095* (2013.01); *A47L 9/242* (2013.01); *A47L 9/248* (2013.01)

(58) Field of Classification Search
CPC ...... F16K 3/0281; F16K 27/044; F16K 3/312; F16K 3/02; F16K 3/316; A47L 7/0095; A47L 9/242; A47L 9/248
See application file for complete search history.

(56) References Cited

U.S. PATENT DOCUMENTS

| | | | | |
|---|---|---|---|---|
| 3,350,056 A | * | 10/1967 | Blumenkranz | F16K 3/0281 251/297 |
| 3,545,480 A | * | 12/1970 | Gustafson | F16K 27/044 251/328 |
| 3,945,606 A | * | 3/1976 | McDonald | F16K 27/044 251/329 |
| 4,204,662 A | * | 5/1980 | Reynolds | F16K 3/02 251/334 |
| 4,703,915 A | * | 11/1987 | King | F16K 3/0281 251/328 |
| 5,950,665 A | * | 9/1999 | Claus | F16K 3/0281 137/625.33 |
| 8,074,962 B1 | * | 12/2011 | Krohmer | F16K 27/044 251/146 |
| 2006/0219969 A1 | * | 10/2006 | Young | F16K 3/0227 251/203 |

FOREIGN PATENT DOCUMENTS

FR                466079 A  *  5/1914

* cited by examiner

*Primary Examiner* — Marina A Tietjen
(74) *Attorney, Agent, or Firm* — Apex Juris, pllc; R. Lynette Wylie

(57) ABSTRACT

A blast gate has a branch dust connector, a main duct connector, and a gate. The branch duct connector has a first tubular portion. The main duct connector is stably connected with the branch duct connector and has a second tubular portion, an inside surface, and a leak-proof protrusion. The inside surface faces the branch duct connector, and the leak-proof protrusion protrudes from the inside surface of the main duct connector and has a protrusion opening communicating with an interior of the second tubular portion. The gate is configured to slide in contact with the leak-proof protrusion to make an interior of the first tubular portion and the protrusion opening isolated from or communicate with each other. The blast gate reduces possibility of formation of gaps between the gate and the main duct connector and thus reduces possibility of air loss.

5 Claims, 7 Drawing Sheets

BLAST GATE FOR DUST COLLECTION

BACKGROUND OF THE INVENTION

1. Field of the Invention

The present invention relates to a woodworking device, and particularly to a blast gate for a dust collecting system.

2. Description of Related Art

In a workspace of woodworking, a dust collecting system is disposed to collect sawdust produced by shaping or cutting wood, which prevents the workspace from being occupied by sawdust and harming workers' respiratory systems. The dust collecting system includes a dust collector and a pipe line, and the pipe line includes a main duct and multiple branch ducts respectively for multiple working machines. A blast gate is disposed between each branch duct and the main duct. In use, some blast gates are open to make corresponding branch ducts communicate with the main duct, and sawdust is sucked into the main duct through the corresponding branch ducts due to suction pressure produced by the dust collector; the other blast gates are closed and respectively isolate the other branch ducts from the main duct to prevent the suction pressure from dispersion.

With reference to FIG. 7, a conventional blast gate for dust collection has a branch duct connector 91, a main duct connector 92, and a gate 93. The branch duct connector 91 has a first tubular portion 911 configured to be connected with and communicate with a corresponding branch duct. The main duct connector 92 has a second tubular portion 921 configured to be connected with and communicate with the main duct. The main duct connector 92 is stably connected with the branch duct connector 91. The gate 93 is a thin plate and is inserted between the main duct connector 92 and the branch duct connector 91. The gate 93 is capable of moving relative to the main duct connector 92 and the branch duct connector 91 and is capable of making the first tubular portion 911 and the second tubular portion 921 isolated from or communicate with each other to isolate the corresponding branch duct from the main duct or make the corresponding branch duct communicate with the main duct.

Nevertheless, the conventional blast gate shown in FIG. 7 has the following shortcomings. When the gate 93 is actuated, the gate 93 slides directly in contact with the interior surface 922 of the main duct connector 92 to cover or open an opening formed on the interior surface 922 and communicating with the interior of the second tubular portion 921. Thereby, the gate 93 can prevent air loss from the opening on the interior surface 922 of the main duct connector 92 and thus prevent the suction pressure from dispersion. However, the interior surface 922 is usually not a complete flat surface due to tolerance of manufacture, or the interior surface 922 is damaged because of friction between the interior surface 922 and the gate 93. The two above-identified situations easily cause gaps to be formed between the interior surface 922 and the gate 93, and thereby the dispersion of the suction pressure of the duct collector still happens, which lowers the efficiency of collecting sawdust.

To overcome the shortcomings of the conventional blast gate, the present invention tends to provide a blast gate for dust collection to mitigate or obviate the aforementioned problems.

SUMMARY OF THE INVENTION

The main objective of the present invention is to provide a blast gate for dust collection that may reduce the possibility of formation of gaps between a main duct connector and a gate and thus reduce the possibility of air loss between the main duct connector and the gate.

The blast gate for dust collection has a branch dust connector, a main duct connector, and a gate. The branch duct connector has a first tubular portion. The main duct connector is stably connected with the branch duct connector and has a second tubular portion, an inside surface, and a leak-proof protrusion. The inside surface faces the branch duct connector, and the leak-proof protrusion is annular, protrudes from the inside surface of the main duct connector, and has a protrusion opening formed in an interior of the leak-proof protrusion and communicating with an interior of the second tubular portion. The gate is inserted between the branch dust connector and the branch main connector and is configured to slide in contact with the leak-proof protrusion so as to make the protrusion opening and an interior of the first tubular portion isolated from or communicate with each other. The first tubular portion of the branch duct connector has an inner wall having an inner diameter tapering toward the main duct connector. The branch duct connector has an inside flange and a tube opening. The inside flange annularly protrudes from the inner wall of the first tubular portion and has an inner diameter tapering toward the main duct connector. The tube opening is located at one of two opposite sides of the branch duct connector located near the main duct connector, communicates with the interior of the first tubular portion, and is enclosed by the inside flange. A tapering angle of the inside flange is larger than that of the inner wall of the first tubular portion.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
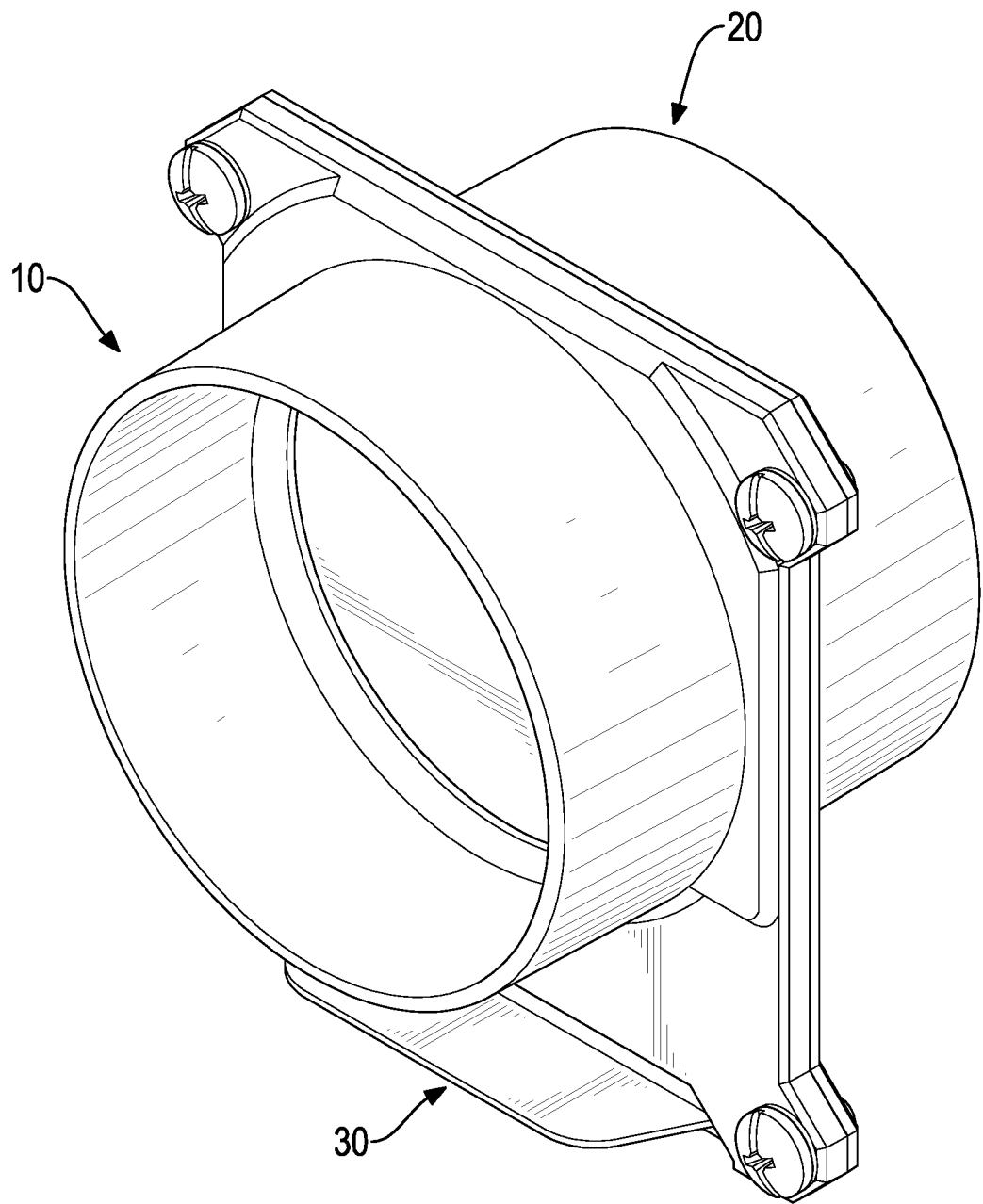
FIG. 1 is a perspective view of a blast gate for dust collection of a preferred embodiment in accordance with the present invention.
Figure 2:
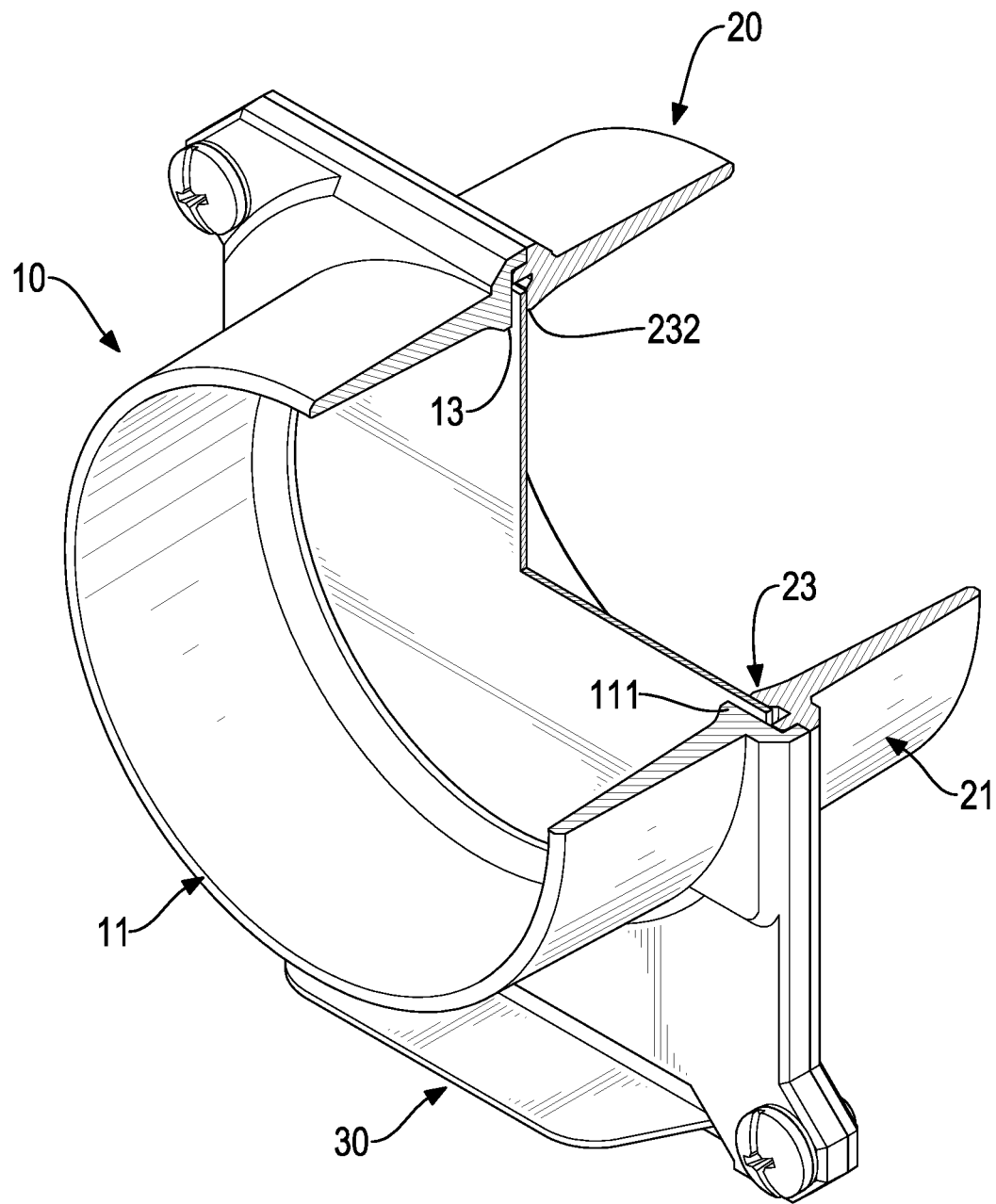
FIG. 2 is a perspective view in partial section of the blast gate for dust collection in FIG. 1.

With reference to FIGS. 1 and 2, a blast gate for dust collection of a preferred embodiment in accordance with the present invention has a branch duct connector 10, a main duct connector 20, and a gate 30. The branch duct connector 10 and the main duct connector 20 are stably connected with each other, and specifically, are connected with each other via bolts. The gate 30 is inserted between the branch duct connector 10 and the main duct connector 20 and is capable of moving relative to the branch duct connector 10 and the main duct connector 20.

Figure 3:
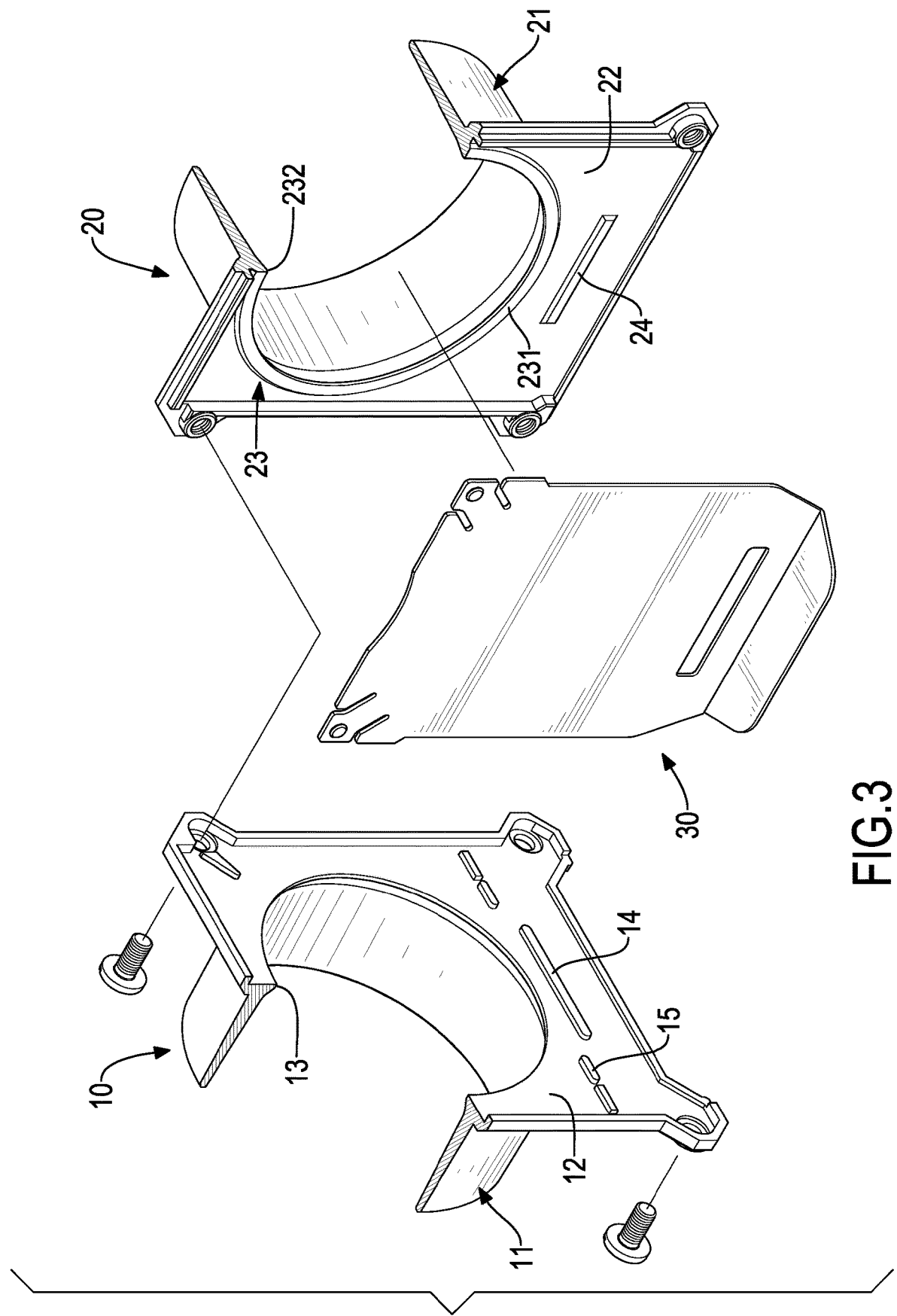
FIG. 3 is an exploded view of the blast gate for dust collection in FIG. 2.
Figure 4:
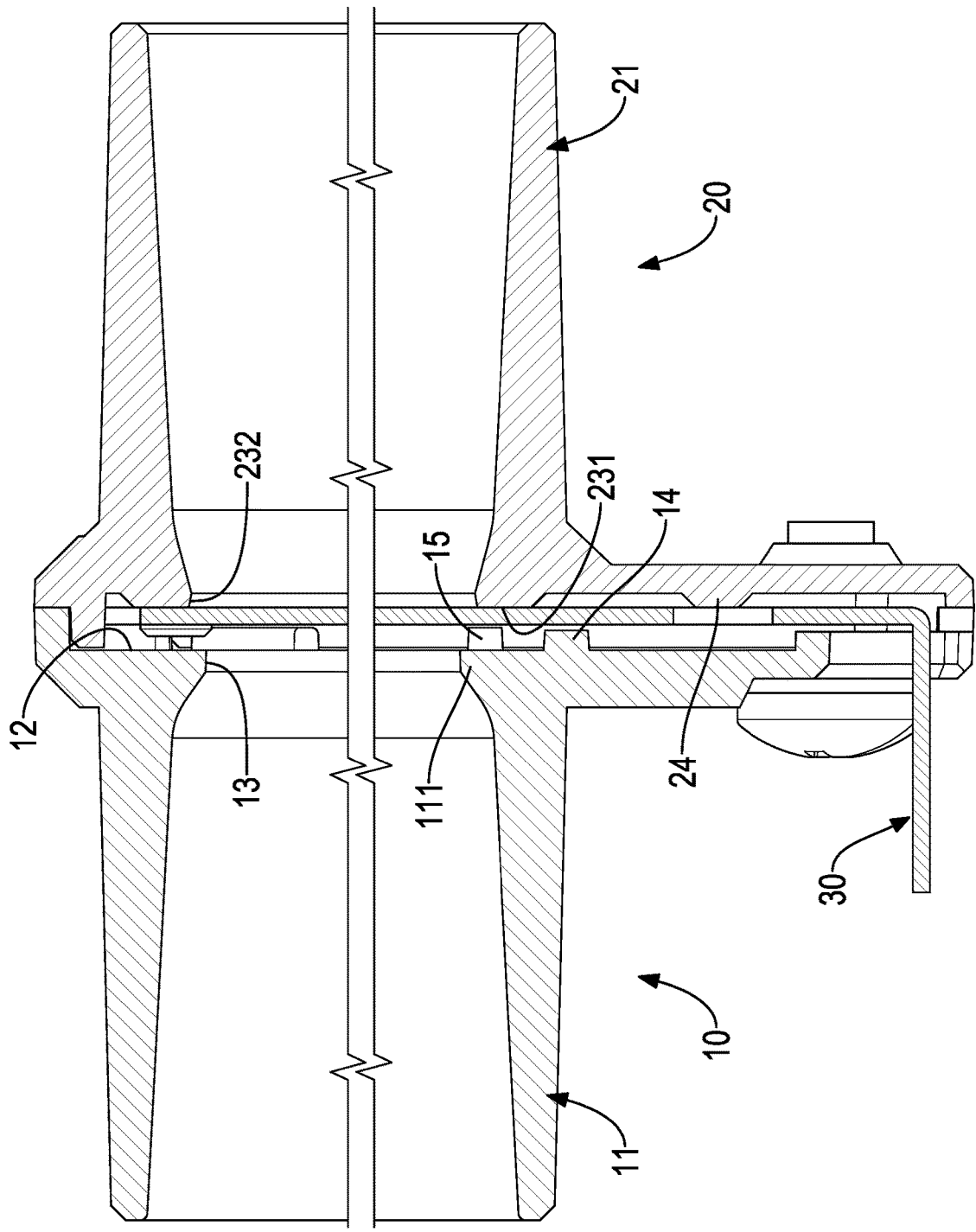
FIG. 4 is a cross-sectional side view of the blast gate for dust collection in FIG. 1.
Figure 6:
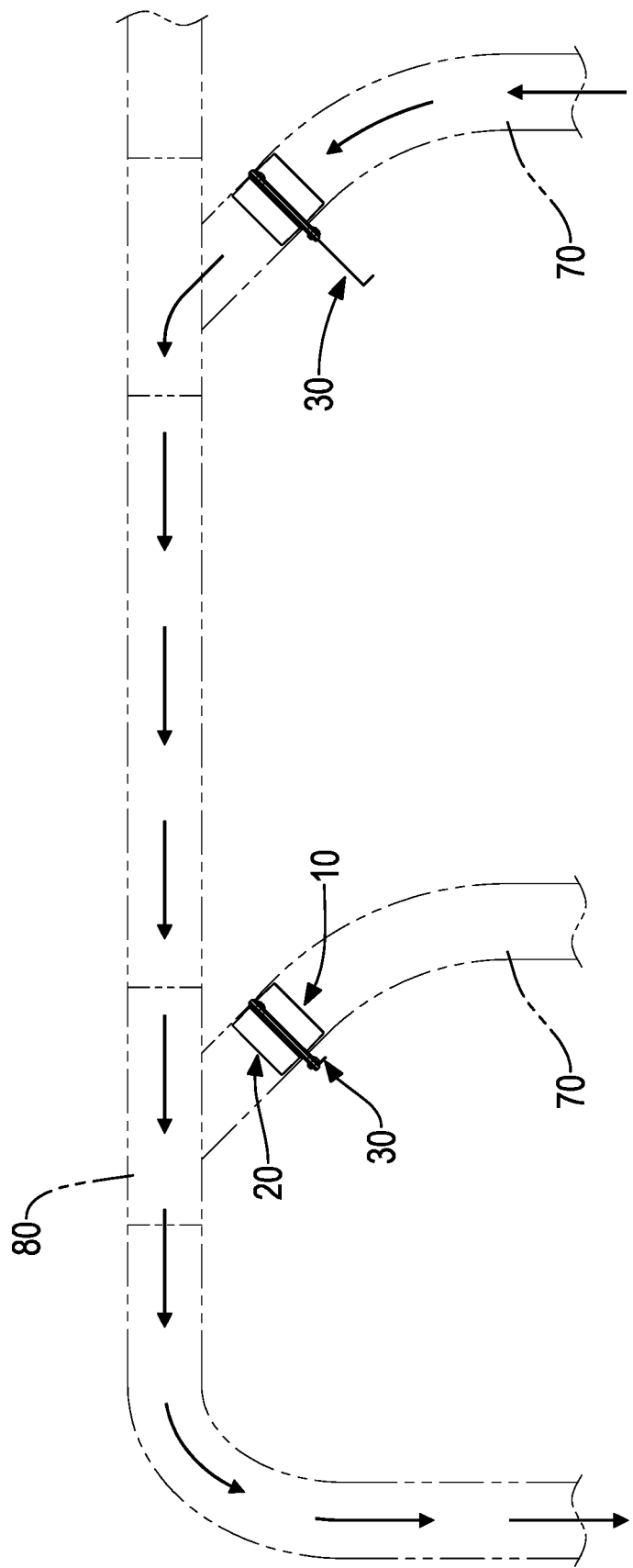
FIG. 6 depicts the blast gate for dust collection in FIG. 1 being applied in a dust collecting system.
Figure 7:
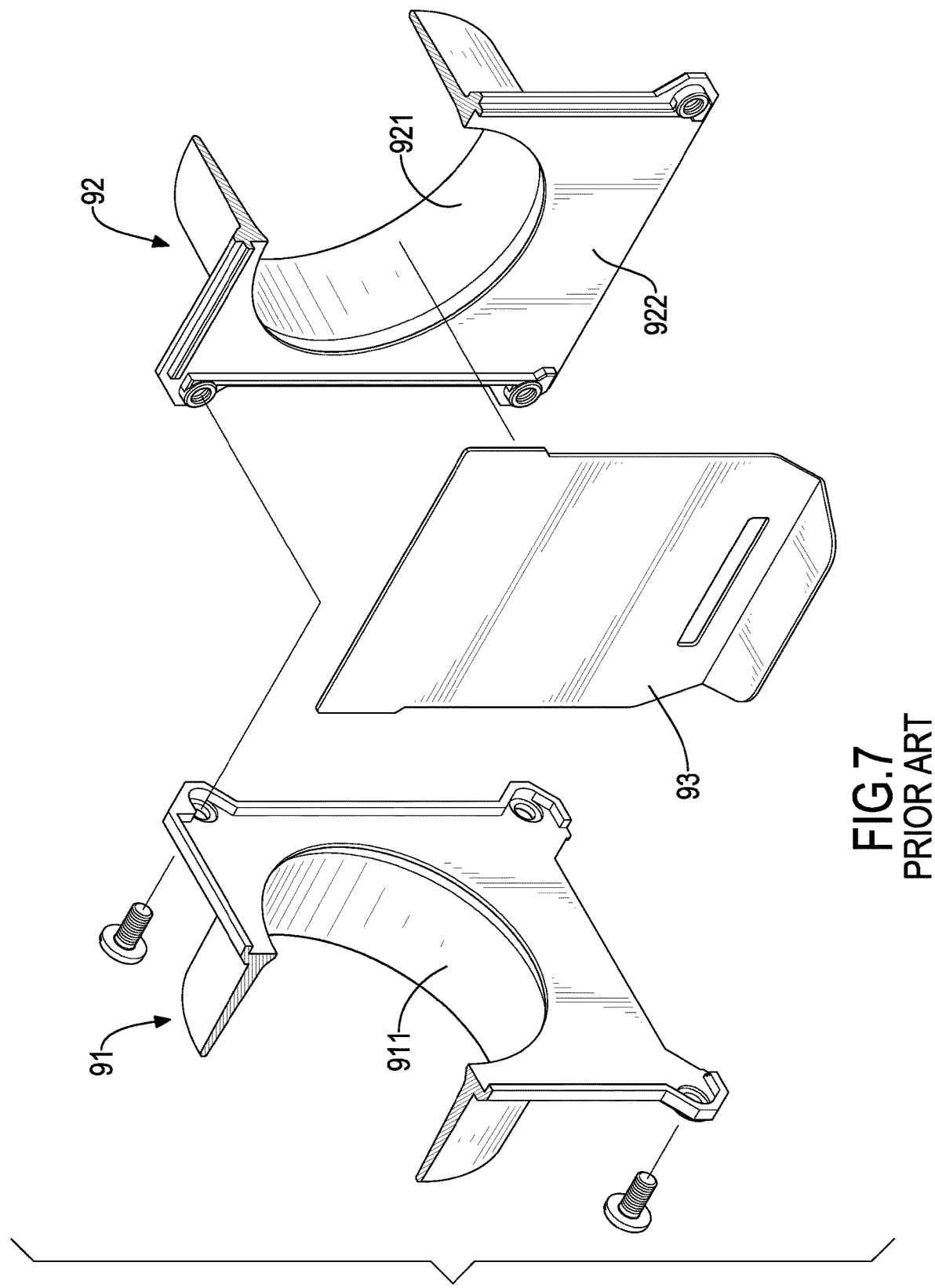
FIG. 7 is an exploded view in partial section of a blast gate in accordance with the prior art.

With reference to FIGS. 2 to 4, the branch duct connector 10 has a first tubular portion 11, an inside surface 12, and a tube opening 13. The first tubular portion 11 is tube-shaped and is configured to be connected with and communicate with one of the multiple branch ducts 70 in a dust collecting system shown in FIG. 6. The inside surface 12 of the branch duct connector 10 faces the main duct connector 20. The tube opening 13 is enclosed by the first tubular portion 11 and communicates with an interior of the first tubular portion 11. Specifically, in the preferred embodiment, the first tubular portion 11 has an inside flange 111 annularly protruding from an inner wall of the first tubular portion 11, and the tube opening 13 is enclosed by the inside flange 111 of the first tubular portion 11.

With reference to FIGS. 2 to 4, the main duct connector 20 has a second tubular portion 21, an inside surface 22, and a leak-proof protrusion 23. The second tubular portion 21 is tube-shaped and is configured to be connected with and communicate with a main duct 80 in a dust collecting system shown in FIG. 6. The inside surface 22 of the main duct connector 20 faces the branch duct connector 10, and specifically, the inside surface 22 of the main duct connector 20 and the inside surface 12 of the branch duct connector 10 face each other. The leak-proof protrusion 23 is annular and protrudes from the inside surface 22 of the main duct connector 20. The leak-proof protrusion 23 has a leak-proof surface 231 and a protrusion opening 232. The leak-proof surface 231 is an annular surface, is formed on a side of the leak-proof protrusion 23 which is located away from the inside surface 22 of the main duct connector 20, and faces the branch duct connector 10. The protrusion opening 232 is formed in an interior of the leak-proof protrusion 23, is enclosed by the leak-proof surface 231, and communicates with an interior of the second tubular portion 21.

With reference to FIGS. 2 to 4, the gate 30 is a thin plate and is made of a rigid material such as metal, plastic, or wood. The gate 30 is inserted between the branch duct connector 10 and the main duct connector 20 and is configured to slide in contact with the leak-proof surface 231 of the leak-proof protrusion 23 to make the protrusion opening 232 communicating with the interior of the second tubular portion 21 and the tube opening 13 communicating with the interior of the first tubular portion 11 isolated from or communicate with each other. Thus, the gate 30 can make the corresponding branch duct 70 and the main duct 80 isolated from or communicate with each other.

Specifically, with reference to FIG. 4, when the blast gate for dust collection is closed, the gate 30 is attached to the leak-proof surface 231 of the leak-proof protrusion 23 and completely covers the leak-proof surface 231. The protrusion opening 232 of the leak-proof protrusion 23 is completely blocked by the gate 30 and cannot communicate with the tube opening 13 of the branch duct connector 10. Thereby, the gate 30 isolates the interior of the second tubular portion 21 from the interior of the first tubular portion 11, and the main duct 80 communicating with the interior of the second tubular portion 21 and the corresponding branch duct 70 communicating with the interior of the first tubular portion 11 are isolated from each other by the gate 30. When a dust collector operates, the gate 30 attached to the leak-proof surface 231 and completely covering the protrusion opening 232 prevents a suction pressure generated by the dust collector from dispersion.

Figure 5:
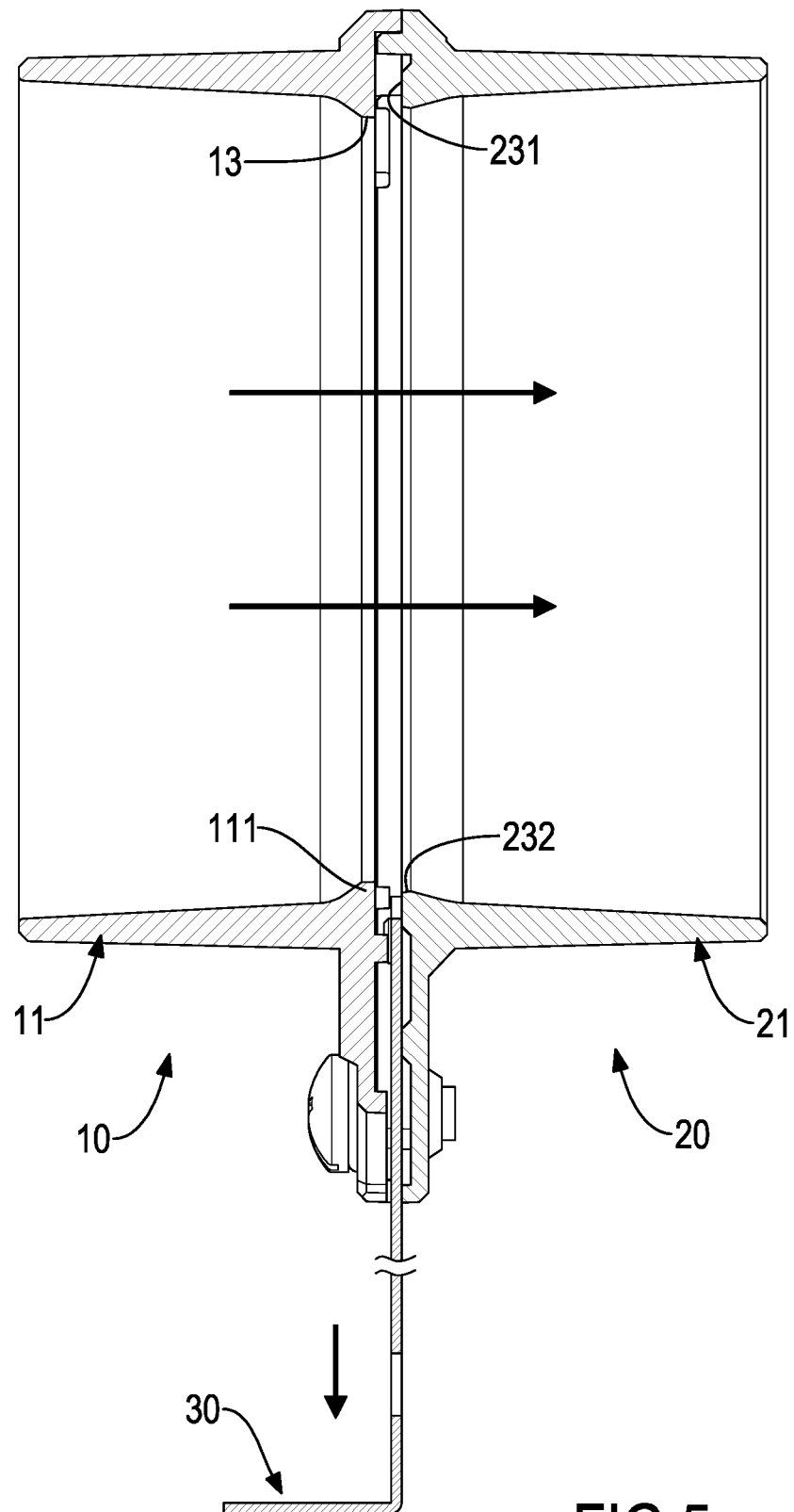
FIG. 5 is an operational cross-sectional side view of the blast gate for dust collection in FIG. 1.

With reference to FIG. 5, when the blast gate for dust collection is turned open, the gate 30 is pulled downward. The gate 30 slides in contact with the leak-proof surface 231 to open the protrusion opening 232 and make the protrusion opening 232 communicate with the tube opening 13 of the branch duct connector 10. Thereby, the interior of the second tubular portion 21 and the interior of the first tubular portion 11 communicate with each other, and the main duct 80 communicating with the interior of the second tubular portion 21 and the corresponding branch duct 70 communicating with the interior of the first tubular portion 11 communicate with each other. When the dust collector operates, an end of the corresponding branch duct 70 located away from the blast gate can suck and collect sawdust and other dusts via the suction pressure generated by the dust collector.

In the present invention, when the gate 30 of the blast gate for dust collection is pulled, the gate 30 slides in contact with the leak-proof protrusion 23. Compared to the conventional blast gate having the gate 93 sliding directly in contact with the interior surface 922 of the main duct connector 92, the present invention can substantially reduce an area of a contact surface between the gate 30 and the main duct connector 20, which reduces the possibility of formation of gaps between the main duct connector 20 and the gate 30 and reduces the possibility of air loss between the main duct connector 20 and the gate 30. Therefore, the efficiency of collecting sawdust of the dust collecting system is maintained at a higher level.

In the preferred embodiment, when the gate 30 is pulled to make the blast gate open, the gate 30 completely leaves a space between the protrusion opening 232 of the leak-proof protrusion 23 and the tube opening 13 of the branch duct connector 10. When an airflow flows from the protrusion opening 232 toward the tube opening 13, the airflow is not interfered by the gate 30, which avoid affecting the sawdust-collecting efficiency of the dust collecting system.

In the preferred embodiment, with reference to FIGS. 4 and 5, the first tubular portion 11 of the branch duct connector 10 has the inner wall, and the inner wall of the branch duct connector 10 has an inner diameter tapering toward the main duct connector 20. According to the Bernoulli's principle, when an airflow flows from the corresponding branch duct 70 toward the main duct connector 20 through the interior of the first tubular portion 11, a flow velocity of the airflow gradually increases as the inner diameter of the inner wall of the first tubular portion 11 gradually decreases. Therefore, sawdust brought by the airflow has more kinetic energy when it flows from the tube opening 13 of the branch duct connector 10 toward the protrusion opening 232 of the leak-proof protrusion 23. The sawdust is less likely to drop into a gap between the branch duct connector 10 and the main duct connector 20 for the gate 30 to slide, which reduces the circumstances of the accumulation and blockage of the sawdust.

In the preferred embodiment, with reference to FIGS. 4 and 5, the second tubular portion 21 of the main duct connector 20 has an inner wall having an inner diameter tapering toward the branch duct connector 10. The airflow flows from the protrusion opening 232 of the leak-proof protrusion 23 toward the main duct 80 through the interior of the second tubular portion 21, and the inner diameter of the inner wall of the second tubular portion 21 gradually increases in the direction of the airflow, which not only helps the configuration of the inner wall of the first tubular portion 11 mentioned above to increase the flow velocity of the airflow with the sawdust flowing from the tube opening 13 toward the protrusion opening 232, but also prevents an airflow from being interfered at an end of the second tubular portion 21 when the airflow flows from the end of the second tubular portion 21 into the main duct 80.

In the preferred embodiment, the first tubular portion 11 of the branch duct connector 10 has the inside flange 111, and the inside flange 111 has an inner diameter tapering toward the main duct connector 20. A tapering angle of the inside flange 111 is larger than a tapering angle of the inner wall of the first tubular portion 11, which further increases the flow velocity of the airflow with the sawdust flowing from the tube opening 13 toward the protrusion opening 232. In other embodiments, the blast gate may adopt one of the two configurations of the inside flange 111 having the inner diameter tapering toward the main duct connector 20 and the inner wall of the first tubular portion 11 having the inner diameter tapering toward the main duct connector 20. In the preferred embodiment, the two configurations above are both adopted, and sawdust accumulation can further be reduced.

With all the configurations mentioned above for increasing the flow velocity of the airflow with the sawdust flowing from the tube opening 13 toward the protrusion opening 232, sawdust accumulation and blockage can be better prevented. Thereby, between the branch duct connector 10 and the main duct connector 20 connected with each other, the blast gate only needs to have an opening formed on a side of the blast gate for the gate 30 for insertion, and the other sides of the blast gate can be completely sealed, which further reduces the possibility of air loss.

With reference to FIG. 3, in the preferred embodiment, the branch duct connector 10 has multiple first limiting blocks, and the multiple first limiting blocks include a main limiting block 14 and multiple assisting limiting blocks 15. The main limiting block 14 and the multiple assisting limiting blocks 15 both protrude from the inside surface 12 of the branch duct connector 10. The main limiting block 14 is disposed right under the tube opening 13, and the multiple assisting limiting blocks 15 are respectively disposed at other positions on the inside surface 12. The main duct connector 20 has a second limiting block 24 protruding from the inside surface 22 of the main duct connector 20. The second limiting block 24 is disposed slightly under the leak-proof protrusion 23, and a protruding distance of the second limiting block 24 from the inside surface 22 is equal to a protruding distance of the leak-proof protrusion 23 from the inside surface 22.

The gate 30 is limited by the branch duct connector 10 and the main duct connector 20 and is thus located between the branch duct connector 10 and the main duct connector 20, which prevents the gate 30 from tilting and makes the gate 30 be attached to the leak-proof protrusion 23 and completely block the protrusion opening 232 when the blast gate is closed. Thereby, the air loss can further be prevented. Besides, the main limiting block 14 under the tube opening 13 catches sawdust dropping and can prevent the sawdust from dropping to the opening into which the gate 30 is inserted and causing the gate 30 to be jammed and unable to be pulled.

In the preferred embodiment, the gate 30 is limited between the multiple first limiting blocks of the branch duct connector 10 and the second limiting block 24 of the main duct connector 20. In other embodiments, the quantity of the first limiting block and that of the second limiting block 24 can be one or multiple. As long as the branch duct connector 10 has at least one said first limiting block with the main duct connector 20 having at least one said second limiting block 24, the gate 30 is limited between the at least one first limiting block and the at least one second limiting block 24, which still prevents the gate 30 from tilting.

In the preferred embodiment, the gate 30 is attached to the leak-proof surface 231 of the leak-proof protrusion 23 being a flat surface. In other embodiments, the leak-proof surface 231 of the leak-proof protrusion 23 may be an arc surface which is annular and is convex toward the branch duct connector 10. In still other embodiments, the leak-proof protrusion 23 may be conical, has a triangular cross-section, and has a circumferential line on the side of the leak-proof protrusion 23 located away from the inside surface 22, and the gate 30 is in line contact with the leak-proof protrusion 23. The embodiments described above also reduce the area of the contact surface between the gate 30 and the main duct connector 20 and reduce the possibility of formation of gaps between the gate 30 and the main duct connector 20 of the present invention.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A blast gate for dust collection comprising:
   a branch duct connector having a first tubular portion;
   a main duct connector stably connected with the branch duct connector and having
      a second tubular portion;
      an inside surface facing the branch duct connector; and
      a leak-proof protrusion being annular, protruding from the inside surface of the main duct connector, and having
         a protrusion opening formed in an interior of the leak-proof protrusion and communicating with an interior of the second tubular portion; and
   a gate inserted between the branch duct connector and the main duct connector and configured to slide in contact with the leak-proof protrusion so as to make the protrusion opening and an interior of the first tubular portion isolated from or communicate with each other;
   wherein
   the first tubular portion of the branch duct connector has an inner wall having an inner diameter tapering toward the main duct connector;
   the branch duct connector has
      an inside flange annularly protruding from the inner wall of the first tubular portion and having an inner diameter tapering toward the main duct connector; and
      a tube opening located at one of two opposite sides of the branch duct connector located near the main duct connector, communicating with the interior of the first tubular portion, and enclosed by the inside flange; and
   a tapering angle of the inside flange is larger than that of the inner wall of the first tubular portion.

2. The blast gate for dust collection as claimed in claim 1, wherein the second tubular portion of the main duct connector has an inner wall having an inner diameter tapering toward the branch duct connector.

3. The blast gate for dust collection as claimed in claim 2, wherein
   the branch duct connector has an inside surface facing the main duct connector;

the branch duct connector has at least one first limiting block protruding from the inside surface of the branch duct connector;

the main duct connector has at least one second limiting block protruding from the inside surface of the main duct connector; and the gate is limited between the at least one first limiting block and the at least one second limiting block.

4. The blast gate for dust collection as claimed in claim 1, wherein the branch duct connector has an inside surface facing the main duct connector;

the branch duct connector has at least one first limiting block protruding from the inside surface of the branch duct connector;

the main duct connector has at least one second limiting block protruding from the inside surface of the main duct connector; and the gate is limited between the at least one first limiting block and the at least one second limiting block.

5. The blast gate for dust collection as claimed in claim 1, wherein the gate is capable of sliding in contact with the leak-proof protrusion to completely leave a space between the tube opening of the branch duct connector and the protrusion opening of the leak-proof protrusion.

\* \* \* \* \*